United States Patent [19]
Tsubaki et al.

[11] Patent Number: 5,381,448
[45] Date of Patent: Jan. 10, 1995

[54] DATA RECEIVING APPARATUS

[75] Inventors: Kazuhisa Tsubaki; Mitsuru Uesugi; Kouichi Honma, all of Yokohama, Japan

[73] Assignee: Matsushita Electric Industrial Co., Ltd., Osaka, Japan

[21] Appl. No.: 871,691

[22] Filed: Apr. 21, 1992

[30] Foreign Application Priority Data

Apr. 30, 1991 [JP] Japan .................................. 3-098499

[51] Int. Cl.⁶ .............................................. H03H 7/30
[52] U.S. Cl. .......................................... 375/14; 333/18
[58] Field of Search ...................... 375/11, 14, 97, 15, 375/13, 12; 364/724.06, 724.2; 333/18, 28 R

[56] References Cited

U.S. PATENT DOCUMENTS

| | | | |
|---|---|---|---|
| 4,298,983 | 11/1981 | Kawai et al. | 375/14 |
| 4,672,631 | 6/1987 | Suzuki et al. | 375/14 |
| 5,132,926 | 7/1992 | MacEachern et al. | 375/14 |

FOREIGN PATENT DOCUMENTS 0106136 4/1984 European Pat. Off. .
8402819 7/1984 WIPO .

OTHER PUBLICATIONS

Nakajima, et al., "Performance of a Decision Feedback Equalizer Under Frequency Selective Fading in Land Mobile Communications," Papers of the Institute of Electronics, Information and Communication Engineers of Japan, vol. J72-B-II, No. 10, pp. 515-523, Oct. 1989.

Widrow, et al., "Adaptive Noise Cancelling: Principles and Applications," Proceedings of the IEEE, vol. 63, No. 12, pp. 1692-1716, Dec. 1975.

Primary Examiner—Stephen Chin
Assistant Examiner—Don Vo
Attorney, Agent, or Firm—Stevens, Davis, Miller & Mosher

[57] ABSTRACT

A data receiving apparatus capable of correctly obtaining decoded data of a received signal even if the center frequency of the received signal has a frequency shift and the state of transmission line changes with time. The coefficient of an equalizer is calculated basing upon an error signal obtained from the received signal and a shift of the center frequency obtained from the error signal. The coefficient is renewed each time a new received signal is supplied.

4 Claims, 2 Drawing Sheets

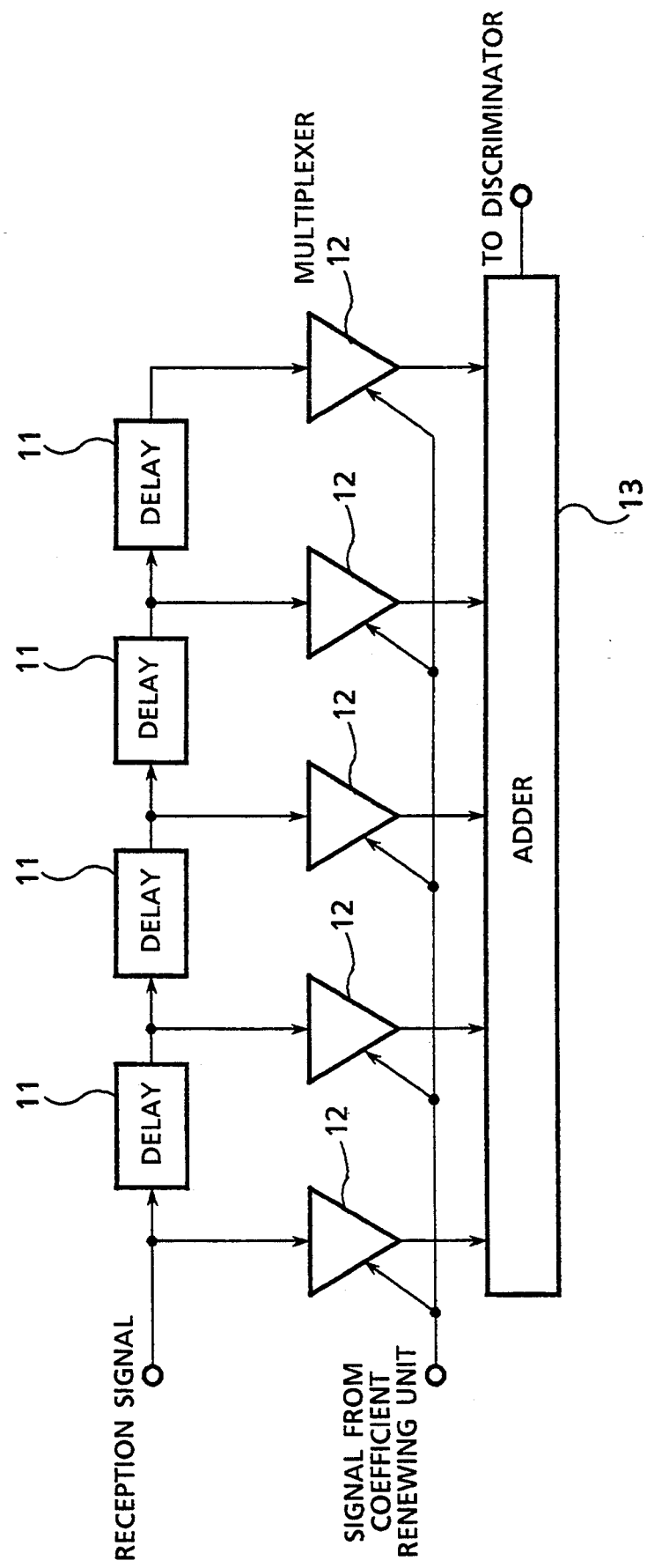

DATA RECEIVING APPARATUS

BACKGROUND OF THE INVENTION

The present invention relates to a data receiving apparatus for use with digital mobile telephones or the like.

FIG. 1 is a block diagram showing the structure of a conventional data receiving apparatus. In FIG. 1, reference numeral 1 represents an equalizer for removing the influence of frequency selective fading from a received signal. Reference numeral 2 represents a discriminator connected to the equalizer 1 for decoding the received signal with the influence of frequency selective fading removed, to obtain data of the received signal. The data decoded by the discriminator 2 is thereafter subject to voice processing. Reference numeral 3 represents a coefficient renewing unit coupled between the equalizer 1 and discriminator 2, for renewing the coefficient of the equalizer 1 in accordance with an error signal detected when the discriminator 2 decodes the received signal to obtain the data.

FIG. 2 shows the detailed structure of the equalizer 1. In FIG. 2, reference numeral 11 represents a delay element. A plurality of delay elements 11 are provided for calculation of received signals sampled in the past. Reference numeral 12 represents multipliers each for multiplying the past received, sampled signal by a coefficient set by the coefficient renewing unit. Reference numeral 13 represents an adder for adding together the outputs of the multipliers 12.

The operation of the conventional data receiving apparatus constructed as above will be described. In FIG. 1, when a received signal is inputted to the equalizer 1, the received signal and past received, sampled signals are multiplied by a predetermined coefficient and added together, the result being outputted to the discriminator 2. The discriminator 2 decodes the inputted signal to obtain decoded data, by selecting a transmission signal nearest, on a phase plane, to the inputted signal from the equalizer 1 and by performing a predetermined modulation scheme such as Gaussian-filtered Minimum Shift Keying. The discriminator 2 also obtains an error signal representing a difference between its input and output signals, and outputs it to the coefficient renewing unit 3. The coefficient renewing unit 3 renews the coefficient of the equalizer 1 to be used for the received signal sampled at the next step by using the following equation (1), in accordance with the error signal outputted from the discriminator 2, so as to make the error signal take a zero value assuming that there is no change in the state of transmission line. This renewal is performed using a coefficient renewal algorithm such as a least mean square (LMS) algorithm described in Widrow B., et al., "Adaptive noise Canceling: Principles and Applications", Proc. IEEE, 63, pp. 1692 to 1716 (1975).

$$K_{i+1} = (K_i + \alpha \cdot r) \qquad (1)$$

where $K_{i+1}$ is a coefficient at the present step, $K_i$ is a coefficient at the last step, $\alpha$ is a constant, and r is an error signal.

In this manner, if the state of the transmission line does not change, the conventional data receiving apparatus can obtain correct decoded data while removing the influence of frequency selective fading.

However, if the center frequency of the received signal has any shift, the state of transmission line changes with time so that the discriminator 2 of the conventional data receiving apparatus cannot correctly decode the received signal and obtain its data.

SUMMARY OF THE INVENTION

It is an object of the present invention to provide an improved data receiving apparatus capable of correctly obtaining decoded data even if the center frequency of the received signal has some shift and the state of transmission line changes with time.

In order to achieve the above object of the present invention, the data receiving apparatus comprises: an equalizer for removing the influence of frequency selective fading from a received signal; a discriminator for obtaining decoded data from the received signal with the influence of frequency selective fading being removed; a frequency shift detector for detecting a shift of the center frequency of the received signal in accordance with an error signal detected when obtaining the decoded data from the received signal; and a coefficient renewing unit for renewing a coefficient of the equalizer in accordance with the error signal and the shift of the center frequency of the received signal.

According to the present invention, the coefficient of the equalizer is renewed in accordance with an error signal detected when obtaining decoded data of a received signal and a shift of the center frequency of the received signal detected basing upon the error signal. Therefore, it is possible to eliminate transmission errors to be caused by frequency selective fading or by a shift of the center frequency of a received signal, thereby allowing correct decoded data to be obtained.

BRIEF DESCRIPTION OF THE DRAWINGS

FIG. 2 is a diagram showing an example of an equalizer; and

DESCRIPTION OF THE PREFERRED EMBODIMENT

Figure 1:
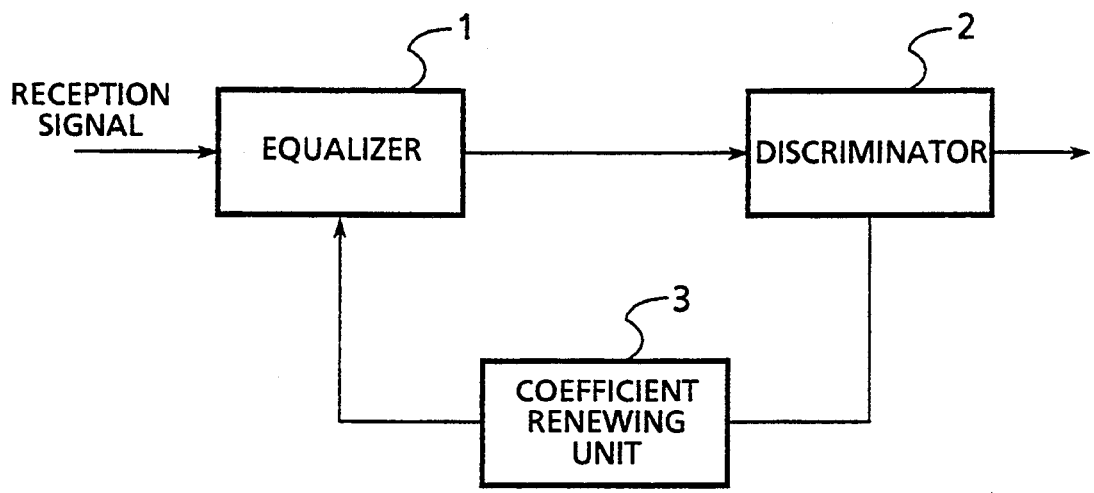
FIG. 1 is a block diagram showing the main structure of a conventional data receiving apparatus.
Figure 3:
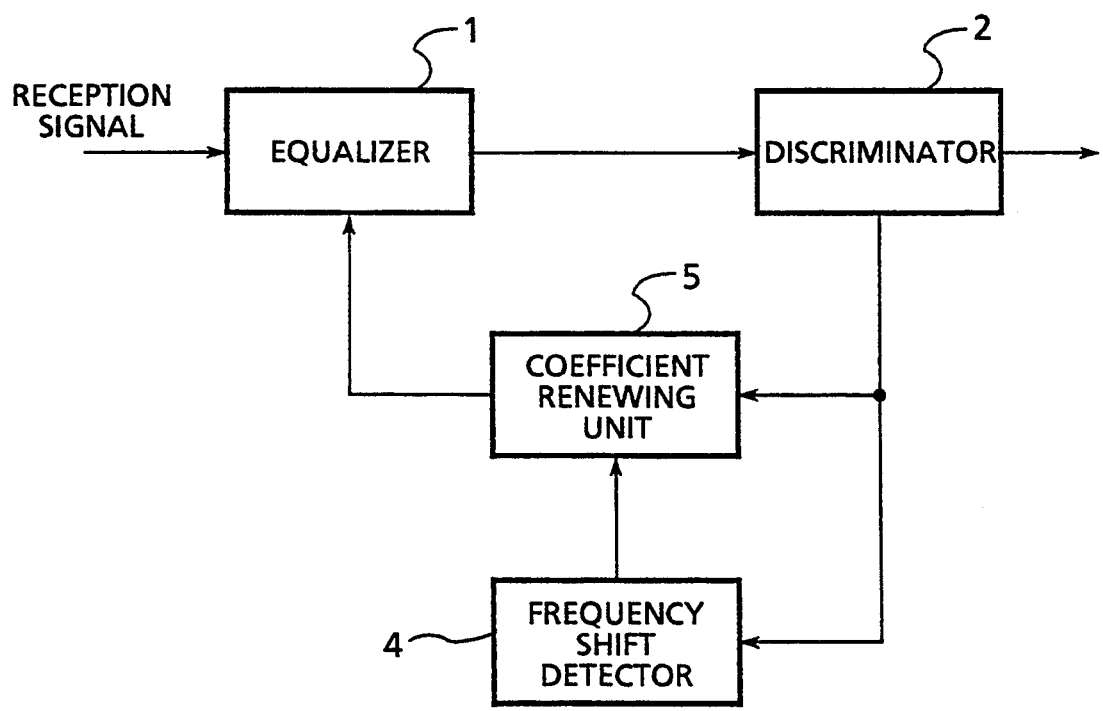
FIG. 3 is a block diagram showing the main structure of a data receiving apparatus according to an embodiment of the present invention.

FIG. 3 shows the structure of a data receiving apparatus according to an embodiment of the present invention. In FIG. 3, reference numeral 1 represents an equalizer for removing the influence of frequency selective fading from a received signal. The equalizer 1 may use the equalizer having the structure shown in FIG. 1, or a decision feedback equalizer such as described in the Papers of The Institute of Electronics, Information, and Communication Engineers of Japan, Vol. J72-B-II, No. 10, October, 1988. Reference numeral 2 represents a discriminator connected to the equalizer 1 for decoding the received signal with the influence of frequency selective fading removed, to obtain data of the received signal. The discriminator 2 also obtains an error signal representing a difference between its input and output signals, the error signal being outputted to a frequency shift detector 4 and a coefficient renewing unit 5. The frequency shift detector 4 connected to the discriminator detects a shift of the center frequency of the received signal in accordance with the error signal. The shift amount and direction of the center frequency are detected depending upon the shift amount and direction of a mean value of error signals. The coefficient renewing unit 5 coupled between the equalizer 1 and discriminator 2 and to the frequency shift detector 4, renews the coefficient of the equalizer 1 in accordance with an error signal detected by the discriminator 2 and with a shift of the center frequency of the received signal detected by the frequency shift detector 4 by using the error signal.

The operation of the data receiving apparatus constructed as above will be described. In FIG. 3, when a received signal is inputted to the equalizer 1, the received signal and past received, sampled signals are multiplied by a predetermined coefficient and added together, the result being outputted to the discriminator 2. The discriminator 2 decodes the inputted signal to obtain decoded data, by selecting a transmission signal nearest, on a phase plane, to the inputted signal from the equalizer 1 and by performing a predetermined modulation scheme such as GMSK. The discriminator 2 also obtains an error signal representing a difference between its input and output signals, and outputs it to the frequency shift detector 4 and coefficient renewing unit 5. The frequency shift detector 4 judges from the error signal from the discriminator 2 whether the phase of the error signal has a tendency of advancing or lagging. If the phase has a tendency of either advancing or lagging, the frequency shift detector 4 calculates a phase amount canceling such a tendency, and outputs it to the coefficient renewing unit 5. In accordance with the error signal from the discriminator and the phase amount necessary for such cancellation from the frequency shift detector, the coefficient renewing unit 3 renews the coefficient of the equalizer 1 for the received signal sampled at the next step by using the following equation (2), so as to make the error signal take a zero value. This renewal is performed using a coefficient renewal algorithm such as a known least mean square (LMS) algorithm. The coefficient is renewed every time a new received signal is supplied to the equalizer 1.

$$K_{i+1} = (K_i + \alpha \cdot r)e^{j\theta} \quad (2)$$

where $K_{i+1}$ is a coefficient at the present step, $K_i$ is a coefficient at the last step, $\alpha$ is a constant, r is an error signal, and $\theta$ is a phase amount necessary for canceling the phase tendency of advancing or lagging.

In the embodiment described above, an error signal detected by the discriminator 2 is outputted to the coefficient renewing unit 5. The frequency shift detector 4 judges the tendency of the error signal from whether the phase has a tendency of advancing or lagging. The frequency shift detector 4 then calculates a phase amount necessary for canceling such a tendency, and outputs it to the coefficient renewing unit 5 to renew the coefficient of the equalizer 1. Therefore, it is possible to remove the influence of frequency selective fading and the shift of the center frequency of a received signal, allowing correct decoded data to be obtained.

We claim:

1. A data receiving apparatus comprising:
   an equalizer for removing an influence of frequency selective fading from a received signal;
   a discriminator for obtaining decoded data from said received signal with the influence of the frequency selective fading being removed;
   a frequency shift detector for detecting a shift of a center frequency of said received signal in accordance with an error signal detected when obtaining said decoded data from said received signal; and
   a coefficient renewing unit for renewing a coefficient of said equalizer in accordance with said error signal and said shift of the center frequency of said received signal.

2. A data receiving apparatus according to claim 1, wherein said discriminator obtains said error signal representing a difference of input and output signals of said discriminator.

3. A data receiving apparatus according to claim 1, wherein said frequency shift detector detects said shift of the center frequency of said received signal in accordance with a shift direction of a mean value of said error signal.

4. A data receiving apparatus according to claim 1, wherein said coefficient renewing unit renews the coefficient of said equalizer in accordance with the following equation:

$$K_{i+1} = (K_i + \alpha \cdot r)e^{j\theta}$$

where $K_{i+1}$ is a coefficient at a present step, $K_i$ is a coefficient at a step before the present step, $\alpha$ is a constant, r is an error signal, and $\theta$ is a phase amount necessary for canceling a phase tendency of advancing or lagging.

* * * * *